Patented Oct. 20, 1931

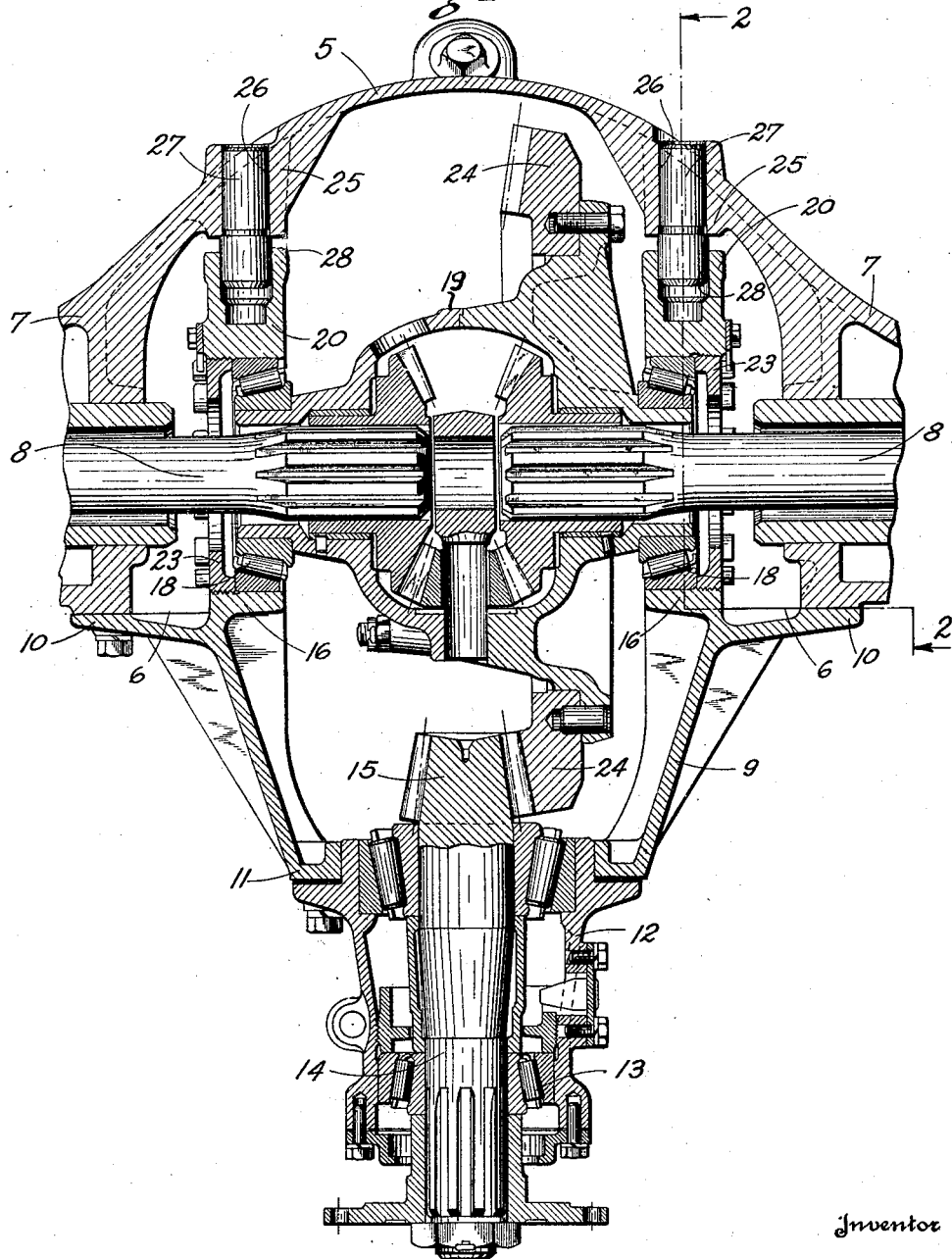

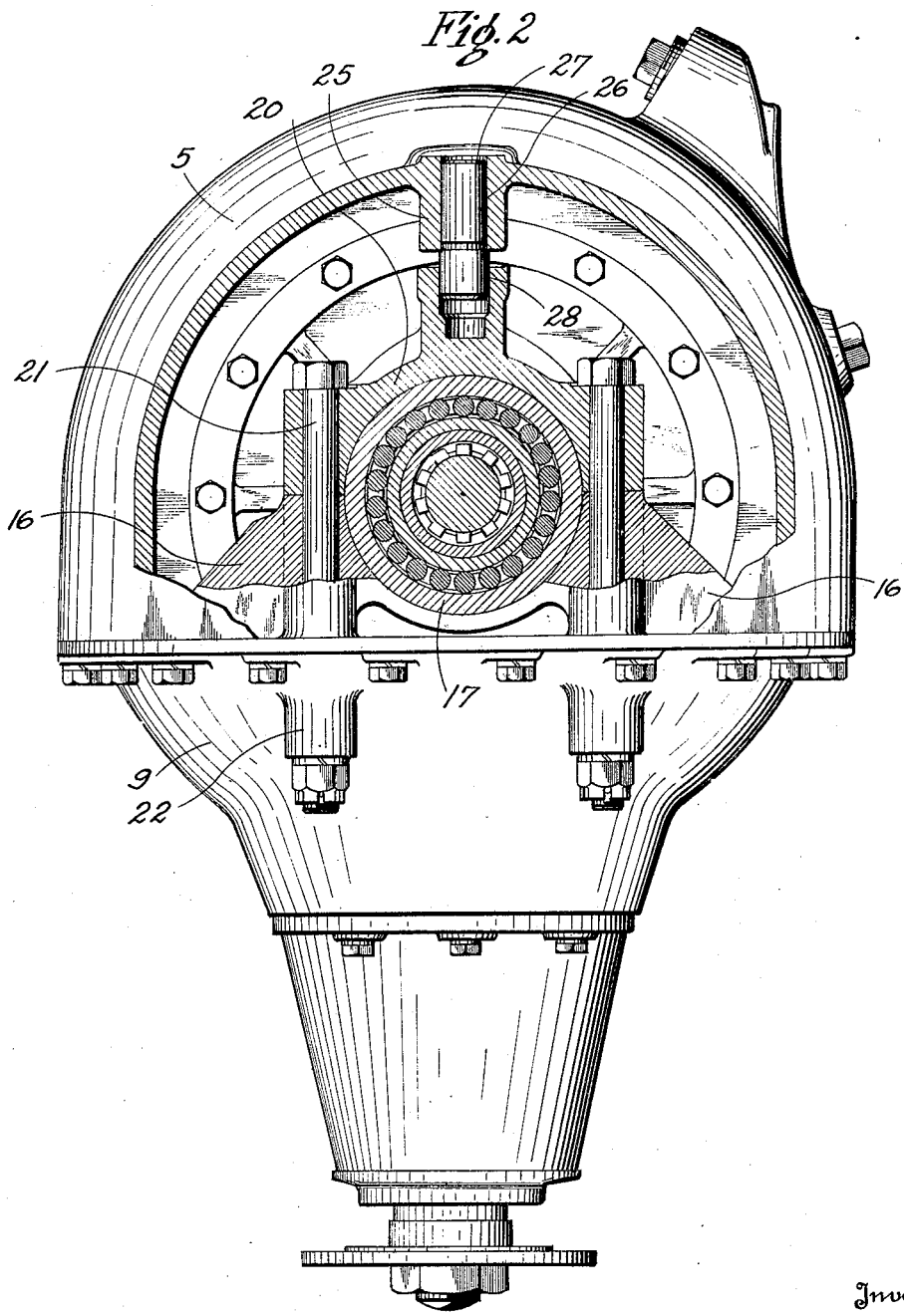

1,828,025

UNITED STATES PATENT OFFICE

HAROLD D. CHURCH, OF CLEVELAND HEIGHTS, OHIO, ASSIGNOR TO THE WHITE MOTOR COMPANY, OF CLEVELAND, OHIO, A CORPORATION OF OHIO

DIFFERENTIAL CARRIER

Application filed March 20, 1930. Serial No. 437,523.

This invention relates to motor vehicles, and particularly to differential carriers to support a differential in the rear axle housing of a vehicle.

The primary object of this invention is to provide a differential carrier for use with a banjo type rear axle housing which will effectively support the differential without wearing or vibration and which will withstand all strains and shocks to which a differential carrier is subjected in service. Another object is to construct the differential carrier in such a manner as to facilitate assembly and servicing. Other objects relating to details of construction and economies of manufacture will appear in the following specification.

In the accompanying drawings, which illustrate a preferred embodiment of the invention:

Fig. 1 is a horizontal section through a rear axle housing and differential, showing a differential carrier constructed in accordance with this invention.

Fig. 2 is a view partly in section and partly in elevation taken on the line 2—2 of Fig. 1 looking in the direction of the arrows.

Referring to the drawings, the numeral 5 designates a rear axle housing of the banjo type. This housing consists of a homogeneous member having an enlarged central portion with an opening 6 in the front side thereof and tubular extensions 7 enclosing the rear axle shafts 8. The opening 6 is closed by a differential carrier 9 which consists of a frusto-conoidal member having an annular flange 10 bolted to the housing 5 around the opening 6, and terminating at its smaller end in an inwardly directed flange 11. A bearing cage 12 is bolted to the flange 11 and encloses the bearings 13 for the stub shaft 14. The latter is arranged to be connected to the propeller shaft of the vehicle and carries on its inner end the main drive pinion 15.

Bearing hangers 16 are cast integral with the differential carrier 9 and project into the housing 5. Each hanger 16 is formed with a semi-circular recess 17 to receive the roller bearings 18. The differential 19, which is of the conventional type, is supported by rotation by the two sets of bearings 18.

Bearing caps 20 are secured to the hangers 16 by bolts 21 which extend to the outer surface of the carrier 9 through apertured bosses 22. The caps 20 are formed with recesses complemental to the recesses 17, and complete the supports for the bearings 18. The hangers 16 and caps 20 are provided with mating threads to receive adjusting nuts 23 which position the differential 19 laterally with respect to the carrier 9 to insure accurate meshing of the ring gear 24 with the drive pinion 15.

The axle housing 5 is provided with a pair of bosses 25 in alinement with the bearing hangers 16. The bosses 25 are formed with openings 26 which receive dowel pins 27 with a driving fit. Recesses 28 are formed in extensions of the bearing caps 20 in axial alinement with the openings 26 to slidably receive the inner ends of the dowel pins 27 and thereby brace the differential carrier 9 and the bearing hangers 16 from the rear wall of the axle housing 5.

In assembling the device, the differential 19, bearings 18, and bearing caps 20 are assembled with the differential carrier 9. The stub shaft 14 and associated parts are assembled with the bearing cage 12 which is bolted to the carrier 9. The dowel pins 27 are driven into the openings 26, and the entire differential assembly is inserted into the axle housing 5 through the opening 6, the pins 27 entering the recesses 28. The flange 10 is then bolted to the axle housing and the axle shafts 8 are inserted through the tubular extensions 7. It will be evident that the engagement of the pins 27 in the recesses 28 insures accurate alinement of the parts, and facilitates the assembly.

In operation, the drive pinion 15 is rotated by the engine through the transmission and propeller shaft and rotates the differential assembly through its engagement with the ring gear 24. The force applied to the ring gear 24 by the drive pinion 15 places a direct vertical load on the bearings 18. Inasmuch as this load acts in the planes of the hangers 16, the latter are capable of effectively withstanding the same. In addition, however, the wedging action between the teeth of the pinion 15 and the ring gear 24 creates a couple tending to rotate the entire differential about a vertical axis. This force is transmitted by the bearings 18 to the hangers 16, and tends to spread the same laterally. In practice, it is found that this force tends to break the hangers from the carrier 9 unless the parts are made of such proportions as to be unwieldy and impractical. The dowel pins 27 transmit these lateral forces to the axle housing 5, and in addition dampen all tendencies of the differential carrier toward vibration induced by sudden applications of power.

Although the foregoing description is necessarily of a detailed character in order that the invention may be fully disclosed, it is to be understood that the specific terminology is not to be construed as restrictive or limiting, and it is to be further understood that various modifications and rearrangements of parts may be resorted to without departing from the scope and spirit of the invention as defined in the following claims.

I claim:

1. In a motor vehicle, the combination with an axle housing having a front wall provided with an opening therethrough and a solid rear wall, a boss integrally formed in said rear wall opposite said opening, a dowel pin projecting from and reinforced by said boss, a closure for said opening having a hanger, a differential supported by said hanger, and a drive shaft assembled in said closure, said closure being adapted to be secured to said housing with said hanger slidably engaging said dowel pin.

2. In a motor vehicle, the combination with an axle housing having an opening and a pair of dowel pins opposite said opening, of a closure for said opening having a pair of hangers, a differential assembled in said hangers, and a drive shaft assembled in said closure, said closure being adapted to be secured to said housing with said hangers engaging said dowel pins.

3. In a motor vehicle, the combination with an axle housing having an opening in the front wall thereof, of a pair of parallel dowel pins opposite said opening, a closure for said opening having a pair of hangers projecting into same, a differential assembled in said hangers and a drive shaft assembled in said closure, said closure being adapted to be secured to said hanger to engage said dowel pin.

In testimony whereof I hereunto affix my signature this 14th day of March, 1930.

HAROLD D. CHURCH.